(12) United States Patent
Pekar et al.

(10) Patent No.: US 12,175,808 B2
(45) Date of Patent: Dec. 24, 2024

(54) ADVANCED CONTROL FRAMEWORK FOR AUTOMOTIVE SYSTEMS

(71) Applicant: Garrett Transportation I Inc., Torrance, CA (US)

(72) Inventors: Jaroslav Pekar, Pacov (CZ); Ferdinando De Cristofaro, Biere (CH)

(73) Assignee: Garrett Transportation I Inc., Torrance, CA (US)

( * ) Notice: Subject to any disclaimer, the term of this patent is extended or adjusted under 35 U.S.C. 154(b) by 486 days.

(21) Appl. No.: 17/241,668

(22) Filed: Apr. 27, 2021

(65) Prior Publication Data

US 2022/0343702 A1 Oct. 27, 2022

(51) Int. Cl.
*G07C 5/08* (2006.01)
*B60L 58/30* (2019.01)
*B60W 20/20* (2016.01)
*B60W 20/40* (2016.01)

(52) U.S. Cl.
CPC ............ *G07C 5/0808* (2013.01); *B60L 58/30* (2019.02); *B60W 20/20* (2013.01); *B60W 20/40* (2013.01); *G07C 5/0841* (2013.01)

(58) Field of Classification Search
CPC ..... G07C 5/0808; G07C 5/0841; B60L 58/30; B60W 20/20; B60W 20/40
See application file for complete search history.

(56) References Cited

U.S. PATENT DOCUMENTS

| 8,614,633 | B1 | 12/2013 | Lear et al. |
| 2006/0137346 | A1 | 6/2006 | Stewart et al. |
| 2010/0017094 | A1 | 1/2010 | Stewart et al. |
| 2010/0204882 | A1* | 8/2010 | Giovaresco ........... F02D 41/266 703/6 |
| 2010/0304925 | A1 | 12/2010 | Fakler et al. |
| 2013/0184901 | A1 | 7/2013 | Wall et al. |
| 2014/0174413 | A1 | 6/2014 | Huang et al. |
| 2016/0229388 | A1 | 8/2016 | Pipho et al. |
| 2017/0318435 | A1* | 11/2017 | Di Tanna ............... B60G 17/00 |

(Continued)

FOREIGN PATENT DOCUMENTS

| DE | 102004051758 A1 | 4/2006 |
| DE | 102008043398 A1 | 5/2010 |

(Continued)

OTHER PUBLICATIONS

Extended European Search Report for EP Application No. 22161641.0 issued Dec. 5, 2022, 11 pages.

(Continued)

*Primary Examiner* — Brian P Sweeney
*Assistant Examiner* — Steven Vu Nguyen
(74) *Attorney, Agent, or Firm* — Seager, Tufte & Wickhem LLP

(57) ABSTRACT

Advanced vehicle control systems are disclosed. Within a vehicle system having several subsystem controllers dedicated to separate tasks in the vehicle, the subsystem controllers may use supplied control parameters. In this context, a centralized optimization unit is configured to receive prediction data, determine, within a prediction horizon, a modification to at least one supplied control parameter using the prediction data; and communicate the modification to the at least one supplied control parameter to at least one subsystem control unit.

17 Claims, 8 Drawing Sheets

(56) References Cited

U.S. PATENT DOCUMENTS

| | | | |
|---|---|---|---|
| 2018/0236883 A1* | 8/2018 | Kokubo | H01M 16/006 |
| 2020/0001169 A1 | 1/2020 | Lazarenka et al. | |
| 2020/0050196 A1 | 2/2020 | Liao-McPherson et al. | |
| 2020/0156639 A1 | 5/2020 | Liu et al. | |
| 2020/0159233 A1 | 5/2020 | Zhang et al. | |
| 2020/0216085 A1 | 7/2020 | Bobier-Tiu et al. | |
| 2020/0273268 A1 | 8/2020 | Bhattacharyya et al. | |
| 2020/0294401 A1 | 9/2020 | Kerecsen | |
| 2020/0318520 A1 | 10/2020 | Walter et al. | |
| 2020/0324789 A1* | 10/2020 | Ando | B60W 60/0025 |
| 2020/0341836 A1 | 10/2020 | Colombo et al. | |
| 2021/0155220 A1* | 5/2021 | Herring | B60L 58/12 |

FOREIGN PATENT DOCUMENTS

| | | |
|---|---|---|
| DE | 102313009945 A1 | 12/2013 |
| DE | 10214224665 A1 | 6/2016 |
| DE | 10219203242 A1 | 9/2020 |
| EP | 2689982 A1 | 1/2014 |

OTHER PUBLICATIONS

European Examination Report for EP Application No. 22161641.0 issued Mar. 5, 2024, 5 pages.

* cited by examiner

ADVANCED CONTROL FRAMEWORK FOR AUTOMOTIVE SYSTEMS

BACKGROUND

An electronic control unit (ECU) is an embedded system in automotive electronics that controls one or more of the electrical systems or subsystems in a vehicle. A variety of ECU types are known, and those present in any given vehicle will depend on the features of the vehicle itself. A vehicle may include, for example and without limitation, control modules for the engine, powertrain, transmission, brakes, body control, suspension, etc., and may further include controllers related to timing, centralized control and general electronics, as desired. Sometimes one assembly incorporates several of the individual control modules, such as by combining engine control and powertrain into a single module.

Modern motor vehicles may have dozens of ECUs, each with its own embedded software and control algorithms. Managing the such complexity is a challenge for original equipment manufacturers (OEMs).

In addition to the overall system complexity, within each ECU complexity is increasing. For example, an engine control module (ECM) may be tasked with determining complex control solutions including power split (such as a power split between an internal combustion engine and a battery, or between a fuel cell and a battery, in a hybrid vehicle for example) and airflow management to maximize fuel efficiency while minimizing or at least controlling emissions. The introduction of modern control algorithms, such as model predictive control (MPC) creates added demands on the hardware of each ECU implementing such tasks. Specialization within the industry further complicates matters, as some components are created by the OEM itself, while others may be integrated from third party suppliers. Further, the availability of additional information, including traffic data, as well as the desire for semi- or fully-autonomous control creates new challenges and opportunities.

New and alternative systematic solutions are desired to enable integration of a distributed set of ECUs using externally obtained information to generate control solutions.

OVERVIEW

The present inventors have recognized, among other things, that a problem to be solved is the need for new and/or alternative ways to integrate updated information in a vehicle control system.

A first illustrative, non-limiting example takes the form of a vehicle control system comprising at least one subsystem control unit configured to control a hardware operation in the vehicle, the at least one subsystem control unit configured to determine a solution in the form of a set of commands for the hardware operation using at least one supplied control parameter; at least one receiving unit for receiving prediction data either from a user of the vehicle or from a source external to the vehicle; a centralized optimization unit coupled to each of the at least one subsystem control unit and the receiving unit and configured to: receive prediction data from the at least one receiving unit; determine, within a prediction horizon, a modification to the at least one supplied control parameter using the prediction data; and communicate the modification to the at least one supplied control parameter to the at least one subsystem control unit.

Additionally or alternatively, the centralized optimization unit comprises at least one data processor and a library of stored instruction sets on non-transient media, the library including at least one stored instruction set configured to perform one or more Linear Algebra operations, including at least Linear Equation Solver, Least Squares, LU, Linear Quadratic Regulation (LQR), LDL, and/or Cholesky factorization.

Additionally or alternatively, the centralized optimization unit comprises at least one data processor and a library of stored instruction sets on non-transient media, the library including at least one stored instruction set configured to perform Numerical Optimization operations including at least a Dynamic Programming, Linear Programming, Quadratic Programming, Sequential Quadratic Programming, Mixed Integer Programming.

Additionally or alternatively, the centralized optimization unit comprises at least one data processor and a library of stored instruction sets on non-transient media, the library including at least one stored instruction set configured to perform Advanced Control operations such as but not limited to Model Predictive Control, Kalman Filtering, Linear Quadratic Regulation, Adaptation Algorithms.

Additionally or alternatively, the centralized optimization unit comprises at least one data processor and a library of stored instruction sets on non-transient media, the library including at least one stored instruction set configured to perform Smart Diagnostic and Prognostic for Vehicle Health Monitoring operations such as but not limited to Health Indicators, Machine Learning, Prognostic Algorithms, Bayesian Network, Expert System, Diagnostic Reasoner.

Additionally or alternatively, the centralized optimization unit comprises at least one data processor and a library of stored instruction sets on non-transient media, the library including at least one stored instruction set configured to perform Predictive Control and Monitoring operations such as but not limited to Speed Advisory System, Predictive Cruise Control, Predictive Power Split, Predictive Thermal Management, Predictive Water Management, Predictive Transmission Management, Predictive Battery Management, and Health Conscious Control.

Additionally or alternatively, the vehicle is a hybrid vehicle having a power system including each of an internal combustion engine and a drive motor, the power system operating using a power split parameter to determine which of the internal combustion engine and the drive motor will deliver power; the subsystem control unit is coupled to the internal combustion engine and the drive motor to control usage thereof in accordance with the power split parameter; the data external to the vehicle includes traffic data; and the centralized optimization unit is configured to modify the power split parameter using the traffic data.

Additionally or alternatively, the vehicle is a hybrid vehicle having a power system including each of an internal combustion engine and a drive motor, the power system operating using a power split parameter to determine which of the internal combustion engine and the drive motor will deliver power; the subsystem control unit is coupled to the internal combustion engine and the drive motor to control usage thereof in accordance with the power split parameter; the data external to the vehicle includes terrain data; and the centralized optimization unit is configured to modify the power split parameter using the terrain data.

Additionally or alternatively, the vehicle is a hybrid vehicle having a drive motor coupled to each of a fuel cell and a battery, the drive motor using a power split parameter determining which of the fuel cell and the battery will provide power to the drive motor; the subsystem control unit is coupled to the drive motor and controls power inputs to the drive motor to control usage thereof in accordance with the power split parameter; the data external to the vehicle includes traffic data; and the centralized optimization unit is configured to modify the power split parameter using the traffic data.

Additionally or alternatively, the centralized optimization unit is coupled to at least a first subsystem control unit operating using a first supplied control parameter and a second subsystem control unit operating using a second supplied control parameter, one of which is the at least one subsystem control unit; and the centralized optimization unit is configured to: analyze the received prediction data and determine priority between the first and second subsystem units; and determine modifications to the first and second supplied control parameters in an order determined by the priority.

Additionally or alternatively, the centralized optimization unit comprises each of: at least one processing core configured to determine the modification to the at least one supplied control parameter using the prediction data; a library storing a plurality of instruction sets on tangible media, including at least a first instruction set for performing a first mathematical analysis of data and a second mathematical analysis of data; and a task scheduler for determining and causing execution of an order of operations by the at least one processing core using the prediction data and one or more selected instructions from the library.

Another illustrative, non-limiting example takes the form of a vehicle control system comprising: a first subsystem control unit configured to control a first hardware operation in the vehicle, the first subsystem control unit configured to determine a control solution in the form of a set of commands for the first hardware operation using at least one supplied control parameter, wherein the first subsystem control unit is configured to: monitor one or more components of the vehicle to determine a change in an operating characteristic of the one or more components; determine that the change in the operating characteristic necessitates recalculation of the at least one supplied control parameter; and generate an update communication including data related to the change in operating characteristic; a centralized optimization unit coupled to the first subsystem control unit and configured to: receive the update communication from the first subsystem control unit and the data related to the change in the operating characteristic; calculate a modification to the at least one supplied control parameter using the data related to the change in the operating characteristic, resulting in an updated control parameter; and communicate the updated control parameter to the first subsystem control unit; wherein the first subsystem control unit is further configured to control the hardware operation using the updated control parameter.

Additionally or alternatively, the centralized optimization unit is configured to schedule a time for the calculation of the modification, and the first subsystem control unit is configured to continue using the supplied control parameter to control the first hardware operation until it receives the updated control parameter from the centralized control unit.

Additionally or alternatively, the vehicle control system may further comprise a second subsystem control unit that controls a second hardware operation using the supplied control parameter, wherein: the centralized optimization unit is configured to communicate the updated control parameter to the second subsystem control unit; and the second subsystem control unit is configured to use the supplied control parameter until receipt of the updated control parameter.

Another illustrative, non-limiting example takes the form of a vehicle control system operable in a vehicle having a plurality of hardware components, the vehicle control system comprising: a health monitoring processor configured to monitor health of one or more of the hardware components of the vehicle, the health monitoring processor further configure to generate health messages relating to the health of the one or more monitored hardware components; a first subsystem control unit configured to control at least a first hardware component in the vehicle, the first subsystem control unit configured to determine a control solution in the form of a set of commands for the first hardware component using at least one supplied control parameter; a centralized optimization unit coupled to the first subsystem control unit and the health monitoring processor, the centralized optimization unit configured to: receive a health message from the health monitoring processor; perform a calibration of the at least one supplied control parameter in response to receiving the health message and thereby calculate a modification to the at least one supplied control parameter, resulting in an updated control parameter; and communicate the updated control parameter to the first subsystem control unit; wherein the first subsystem control unit is further configured to control the hardware operation using the updated control parameter.

Additionally or alternatively, the plurality of hardware components comprises a battery and an internal combustion engine; the health monitoring processor is configured to determine the health the battery and communicate a battery health message to the centralized optimization unit; and responsive to the battery health message, the centralized optimization unit is configured to calibrate a parameter used in determining power split between the battery and the internal combustion engine.

Additionally or alternatively, the plurality of hardware components comprises an actuator that controls position of a valve; the health monitoring processor is configured to determine the health of the actuator and communicate an actuator health message to the centralized optimization unit; the first subsystem control unit is configured to issue control signals to the actuator; and the updated control parameter changes how the first subsystem control unit issues control signals to the actuator.

Additionally or alternatively, the vehicle control system may further comprise at least one receiving unit for receiving prediction data either from a user of the vehicle or from a source external to the vehicle; wherein the centralized optimization unit is configured to receive prediction data from the receiving unit and, responsive thereto, to perform calibration of the at least one supplied control parameter using the prediction data resulting in a recalibrated control parameter, and to communicate the recalibrated control parameter to the first subsystem control unit.

Additionally or alternatively, the prediction data relates at least one of traffic and terrain.

Still another illustrative, non-limiting example takes the form of a method of controlling a vehicle system comprising, with a first subsystem control unit configured to control a hardware operation in the vehicle, determining a control solution in the form of a set of commands for the hardware operation using at least one supplied control parameter; receiving prediction data either from a user of the vehicle or from a source external to the vehicle at a receiving unit; and, with a centralized optimization unit coupled to each of the at least one subsystem control unit and the receiving unit, receiving prediction data from the at least one receiving unit; determining a modification to the at least one supplied control parameter using the prediction data; and communicate the modification to the at least one supplied control parameter to the at least one subsystem control unit. The modification may be calculated relative to a prediction horizon.

Additionally or alternatively, the centralized optimization unit comprises at least one data processor and a library of stored instruction sets on non-transient media, and the modification is determined using one or more Linear Algebra operations, including at least Linear Equation Solver, Least Squares, LU, Linear Quadratic Regulation (LQR), LDL, and/or Cholesky factorization, instruction sets for which are stored in the library.

Additionally or alternatively, the centralized optimization unit comprises at least one data processor and a library of stored instruction sets on non-transient media, and the modification is determined using one or more Numerical Optimization operations including at least a Dynamic Programming, Linear Programming, Quadratic Programming, Sequential Quadratic Programming, Mixed Integer Programming, instruction sets for which are stored in the library.

Additionally or alternatively, the centralized optimization unit comprises at least one data processor and a library of stored instruction sets on non-transient media, and the modification is determined using one or more Advanced Control operations such as but not limited to Model Predictive Control, Kalman Filtering, Linear Quadratic Regulation, Adaptation Algorithms, instruction sets for which are stored in the library.

Additionally or alternatively, the centralized optimization unit comprises at least one data processor and a library of stored instruction sets on non-transient media, and the modification is determined using one or more Smart Diagnostic and Prognostic for Vehicle Health Monitoring operations such as but not limited to Health Indicators, Machine Learning, Prognostic Algorithms, Bayesian Network, Expert System, Diagnostic Reasoner, instruction sets for which are stored in the library.

Additionally or alternatively, the centralized optimization unit comprises at least one data processor and a library of stored instruction sets on non-transient media, and the modification is determined using one or more Predictive Control and Monitoring operations such as but not limited to Speed Advisory System, Predictive Cruise Control, Predictive Power Split, Predictive Thermal Management, Predictive Water Management, Predictive Transmission Management, Predictive Battery Management, Health Conscious Control, instruction sets for which are stored in the library.

Additionally or alternatively, the vehicle is a hybrid vehicle having a power system including each of an internal combustion engine and a drive motor, the power system operating using a power split parameter to determine which of the internal combustion engine and the drive motor will deliver power; the subsystem control unit is coupled to the internal combustion engine and the drive motor to control usage thereof in accordance with the power split parameter; the data external to the vehicle includes traffic data; and the modification uses the traffic data to modify the power split parameter.

Additionally or alternatively, the vehicle is a hybrid vehicle having a power system including each of an internal combustion engine and a drive motor, the power system operating using a power split parameter to determine which of the internal combustion engine and the drive motor will deliver power; the subsystem control unit is coupled to the internal combustion engine and the drive motor to control usage thereof in accordance with the power split parameter; the data external to the vehicle includes terrain data; and the modification uses the terrain data to modify the power split parameter.

Additionally or alternatively, the vehicle is a hybrid vehicle having a drive motor coupled to each of a fuel cell and a battery, the drive motor using a power split parameter determining which of the fuel cell and the battery will provide power to the drive motor; the subsystem control unit is coupled to the drive motor and controls power inputs to the drive motor to control usage thereof in accordance with the power split parameter; the data external to the vehicle includes traffic data; and the modification uses the traffic data to modify the power split parameter using the traffic data.

Additionally or alternatively, the centralized optimization unit is coupled to at least a first subsystem control unit operating using a first supplied control parameter and a second subsystem control unit operating using a second supplied control parameter, one of which is the at least one subsystem control unit; and the method comprises the centralized optimization unit analyzing the received prediction data and determining priority between the first and second subsystem units; and determining modifications to the first and second supplied control parameters in an order determined by the priority.

Additionally or alternatively, the centralized optimization unit comprises each of: at least one processing core configured to determine the modification to the at least one supplied control parameter using the prediction data; a library storing a plurality of instruction sets on tangible media, including at least a first instruction set for performing a first mathematical analysis of data and a second mathematical analysis of data; and the method comprises the centralized optimization unit, via a task scheduler, determining and causing execution of an order of operations by the at least one processing core using the prediction data and one or more selected instructions from the library.

An illustrative, non-limiting example takes the form of a method of operation in a vehicle control system comprising a first subsystem control unit controlling a first hardware operation in the vehicle by determining a control solution in the form of a set of commands for the first hardware operation using at least one supplied control parameter; monitoring one or more components of the vehicle to determine a change in an operating characteristic of the one or more components; determining that the change in the operating characteristic necessitates recalculation of the at least one supplied control parameter; generating an update communication including data related to the change in operating characteristic; receiving the update communication at a centralized optimization unit coupled to the first subsystem control unit; the centralized optimization unit calculating a modification to the at least one supplied control parameter using the data related to the change in the operating characteristic, resulting in an updated control parameter; the centralized optimization unit communicating the updated control parameter to the first subsystem control unit; and the first subsystem control unit controlling the hardware operation using the updated control parameter.

Additionally or alternatively, the method includes the centralized optimization scheduling a time for the calculation of the modification, and the first subsystem control unit continuing to use the supplied control parameter to control the first hardware operation until receiving the updated control parameter from the centralized control unit.

Still another illustrative and non-limiting example takes the form of a method of operating a vehicle control system in a vehicle having a plurality of hardware components, the method comprising monitoring one or more hardware components with a health monitoring processor; the health monitoring processor generating health messages relating to the health of the one or more monitored hardware components; controlling at least a first hardware component in the vehicle with a first subsystem control unit by determining a control solution in the form of a set of commands for the first hardware component using at least one supplied control parameter; receiving, at a centralized optimization unit coupled to the first subsystem control unit and the health monitoring processor, a health message from the health monitoring processor; the centralized optimization unit performing a calibration of the at least one supplied control parameter in response to receiving the health message and thereby calculating an updated control parameter; communicating the updated control parameter to the first subsystem control unit; and the first subsystem control unit controlling the hardware operation using the updated control parameter.

Additionally or alternatively, the plurality of hardware components comprises a battery and an internal combustion engine; the health message relates to health of the battery; and the updated control parameter relates to a power split between the battery and the internal combustion engine.

Additionally or alternatively, the plurality of hardware components comprises a battery and a fuel cell both powering a motor; the health message relates to health of the battery; and the updated control parameter relates to a power split between the battery and the fuel cell.

Additionally or alternatively, the plurality of hardware components comprises an actuator that controls position of a valve; the health message relates to health of the actuator; the first subsystem control unit controls the actuator; and the updated control parameter changes how the first subsystem control unit issues control signals to the actuator.

Additionally or alternatively, the vehicle further comprises at least one receiving unit for receiving prediction data either from a user of the vehicle or from a source external to the vehicle; and the method comprises the receiving unit receiving prediction data and communicating prediction data to the centralized optimization unit; the centralized optimization unit responding to the prediction data by calibrating the at least one supplied control parameter using the prediction data resulting in a recalibrated control parameter; and communicating the recalibrated control parameter to the first subsystem control unit. The prediction data may relate to at least one of traffic and terrain.

This overview is intended to introduce the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
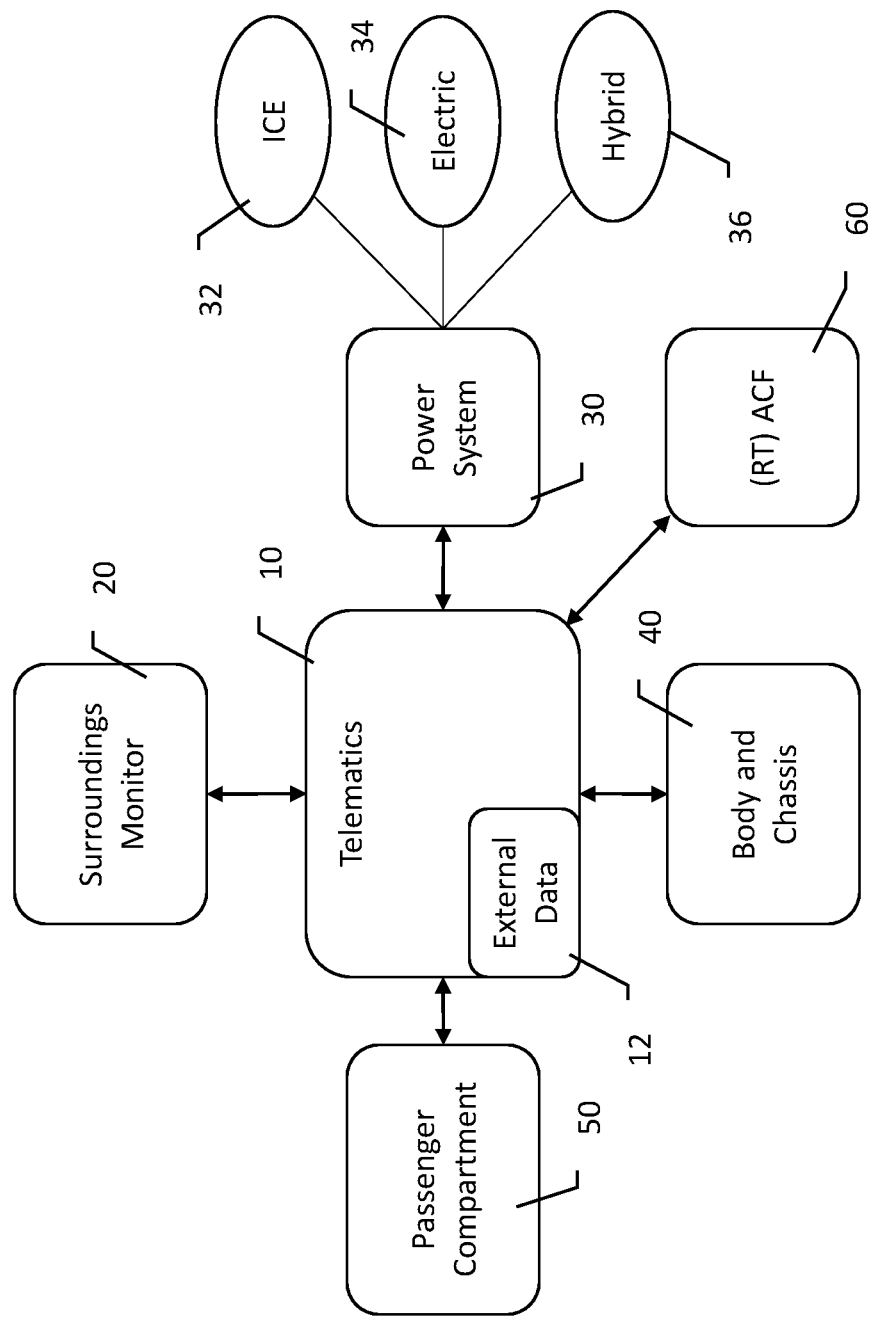
FIG. 1 illustrates a vehicle system in block form.

FIG. 1 shows in block form various elements of a vehicle control system. The vehicle may be, for example and without limitation, a car, truck, train, airplane or boat. The illustrative system includes a telematics unit 10 which interfaces with several illustrative vehicle subsystems. A surroundings monitor subsystem (SMS) is shown at 20 and may include further subsystems such as, for example and without limitation, camera, LIDAR, and/or radar systems. The SMS 20 may further include subsystems for driver assistance and/or autonomous control over the vehicle, if desired. A power subsystem is shown at 30 and may be configured to control, for example and without limitation, hardware and actions related to fuel, airflow, engine, motor, fuel cell, and/or transmission. The power subsystem 30 may incorporate an internal combustion engine 32 (diesel, gasoline or other fuel), an electric motor 34, or a hybrid 36 combustion/electric system having both an internal combustion engine and a drive motor(s) with associated batteries, or any other power generation system. A fuel cell may replace the internal combustion engine 32. A hybrid 36 may instead combine a fuel cell technology with a battery system, where electrical power split may be calculated as between electrical power supplied from the fuel cell and that from the battery, where the battery may store, for example and without limitation, power gleaned from a operation of the fuel cell, regenerative braking system or solar panels. The power system 30 may be broken into further subparts and/or subsystems, such as by separately controlling the transmission, engine, and/or airflow system, thermal system, motor, fuel cell, batteries, as desired. A body and chassis subsystem is shown at 40 and may include, for example and without limitation, still further subsystems such as suspension, stability control, tire monitoring, steering, brake controls, etc. A passenger compartment subsystem may be included as shown at 50 and may include, for example and without limitation, infotainment, heating, ventilation and air conditioning (HVAC), comfort and passenger restraint subsystems.

In some examples, each subsystem may have its own controller or plurality of subsystem controllers. Subsystem controllers (and any other controller in the system) may be implemented as electronic control units (ECUs) in the form of microcontrollers, microprocessors, or state machines, along with associated memory for storing data and machine-readable instruction sets in, for example, any suitable non-transitory media, and other circuitry as needed, such as communication, logic or signal processing circuits, for example.

The telematics unit 10 may include a microprocessor or microcontroller, or other control circuitry (such as a state machine), various logic circuitry, and a memory for storing operational instruction sets as well as for storing various data, as further detailed below. The telematics unit 10 may be operatively linked to an on-board diagnostics (OBD) port that a technician may plug into with an external diagnostics computer to download information from the system. Such a port may be a standardized or non-standard interconnection, such as using any of various OBD standard forms, USB, Ethernet, other electrical, optical coupling, or any other suitable coupling. Rather than a physical port 12, some systems may use a wireless connection (Bluetooth, WiFi, cellular 4G or 5G, etc.). The telematics unit 10 may also receive external data, such as preview data regarding a travel route (traffic, terrain, weather, etc.). A range of commercially available systems provide such preview data (TomTom®, Bosch®, HERE, eHorizon®, for example), which can be used by a driver to modify routes and anticipate upcoming driving conditions. However, more can be done to integrate the information provided systemically. For example, while a driver may adjust route selection and speed demand, such choices do not address optimizing vehicle performance.

Interactions among these various blocks 10, 20, 30, 40, 50 may take place via wired or wireless connections, using one or more busses for example, and may include a range of different signal types. One solution in vehicles is the use of the Controller Area Network (CAN) Bus architecture. In an example, each CAN Bus node includes a central processor, a CAN controller, and a CAN transceiver as defined by ISO 11898 and its various subparts. Other communication systems, such as a Local Area Network (LAN) may be used instead.

FIG. 1 shows an additional block at 60. Block 60 represents a centralized optimization unit in the form of an advanced controls framework (ACF). The ACF 60 may be, to some extent, a real-time (RT). By real-time, in this context, the intended meaning is that the ACF 60 can perform optimization tasks in an ongoing and running fashion, providing updated optimization parameters for other subsystems on a regular basis in the vehicle without requiring the system to go off-line and/or without requiring the system to have an interaction with a technician. In some examples, the ACF enables the various subsystems to better take advantage of updated information, including that received via the telematics unit form outside the vehicle, as well as data generated within the various subsystems, such as but not limited to, component health metrics. That is, the ACF can operate in "real time" as that term is used herein if the ACF updates one or more optimization parameters while the vehicle is in operation, as opposed to sitting at a test stand and undergoing analysis and/or calibration by a technician. Various illustrative features of an example ACF are shown in detail in FIG. 5, with process flow in FIG. 6, while several applications and architectures based on the ACF are discussed relative to FIGS. 2-4.

Figure 2:
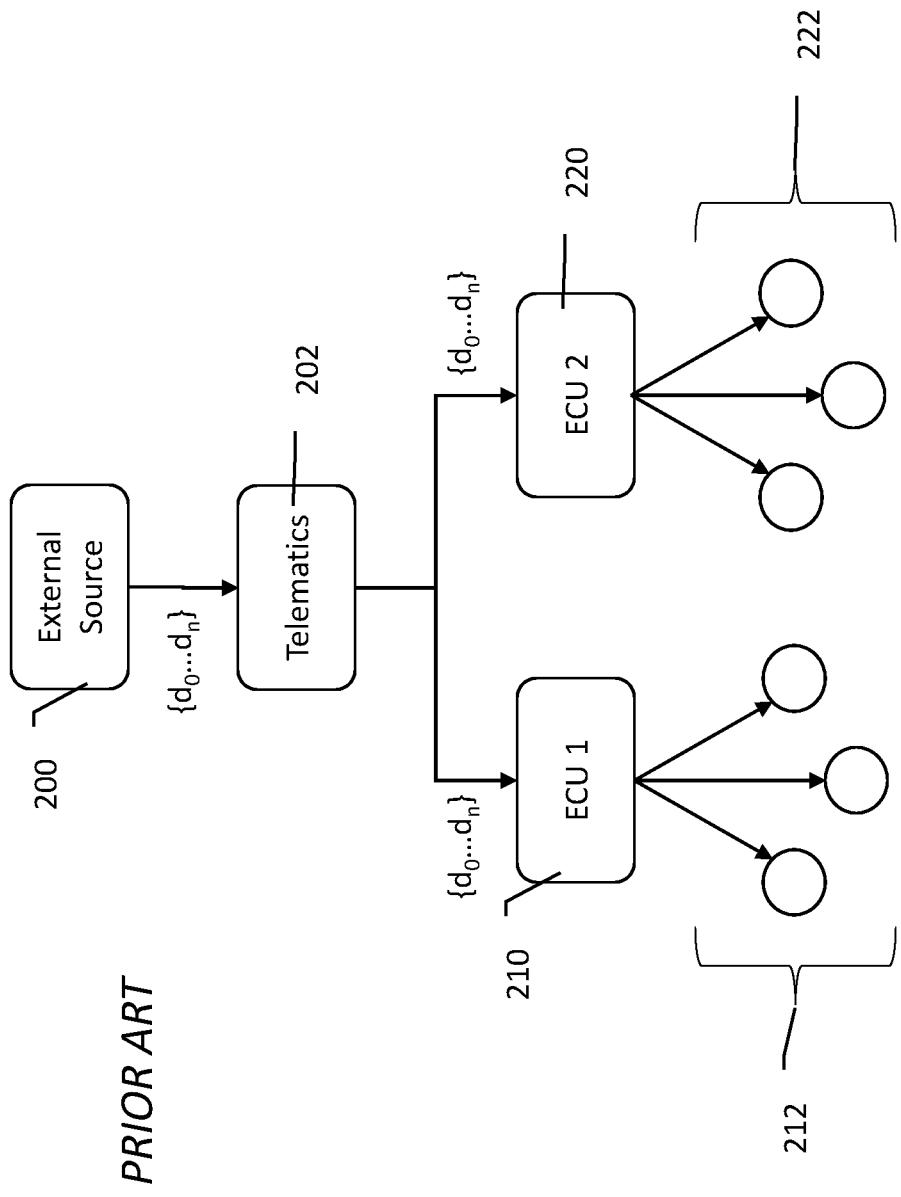
FIGS. 2-4 show illustrative control architectures.
Figure 3:
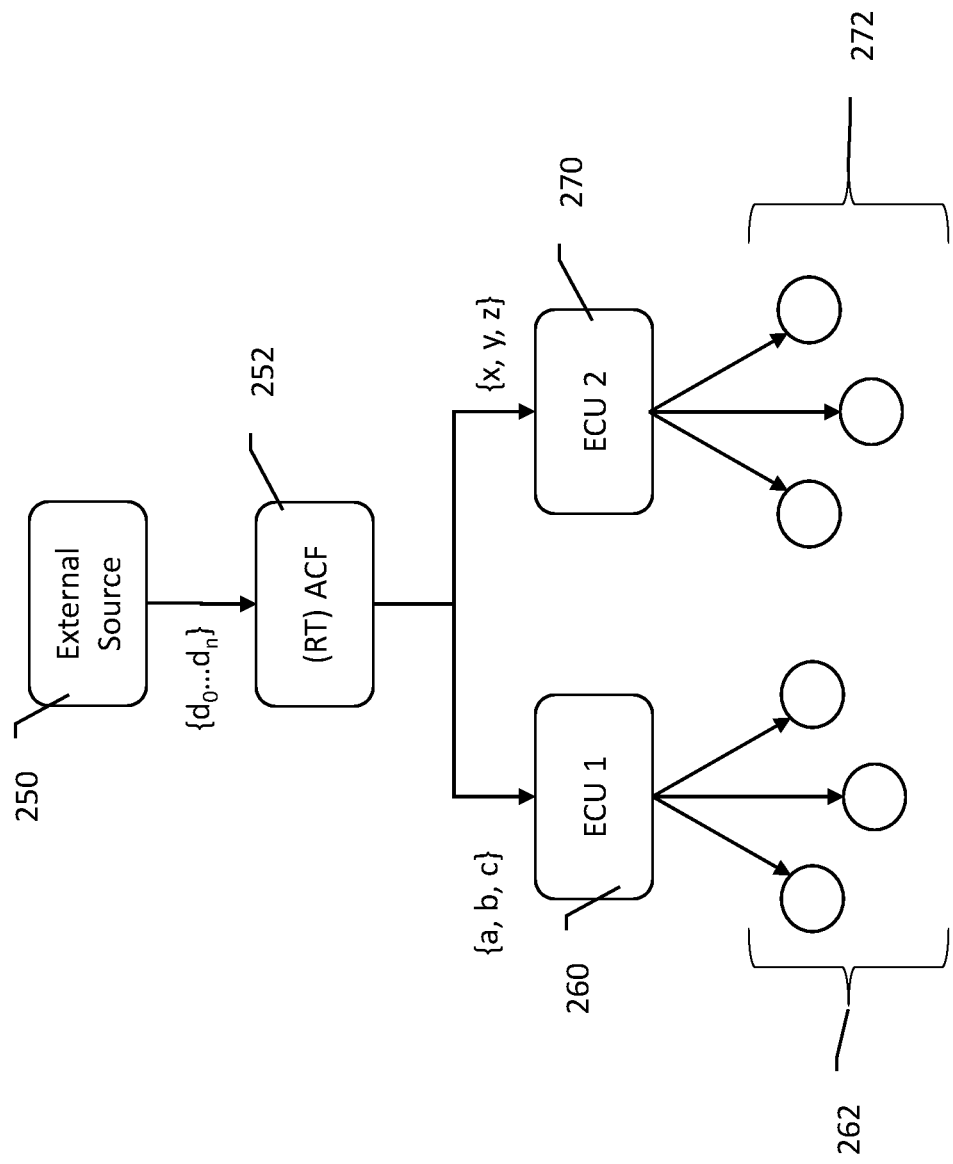
Figure 4:
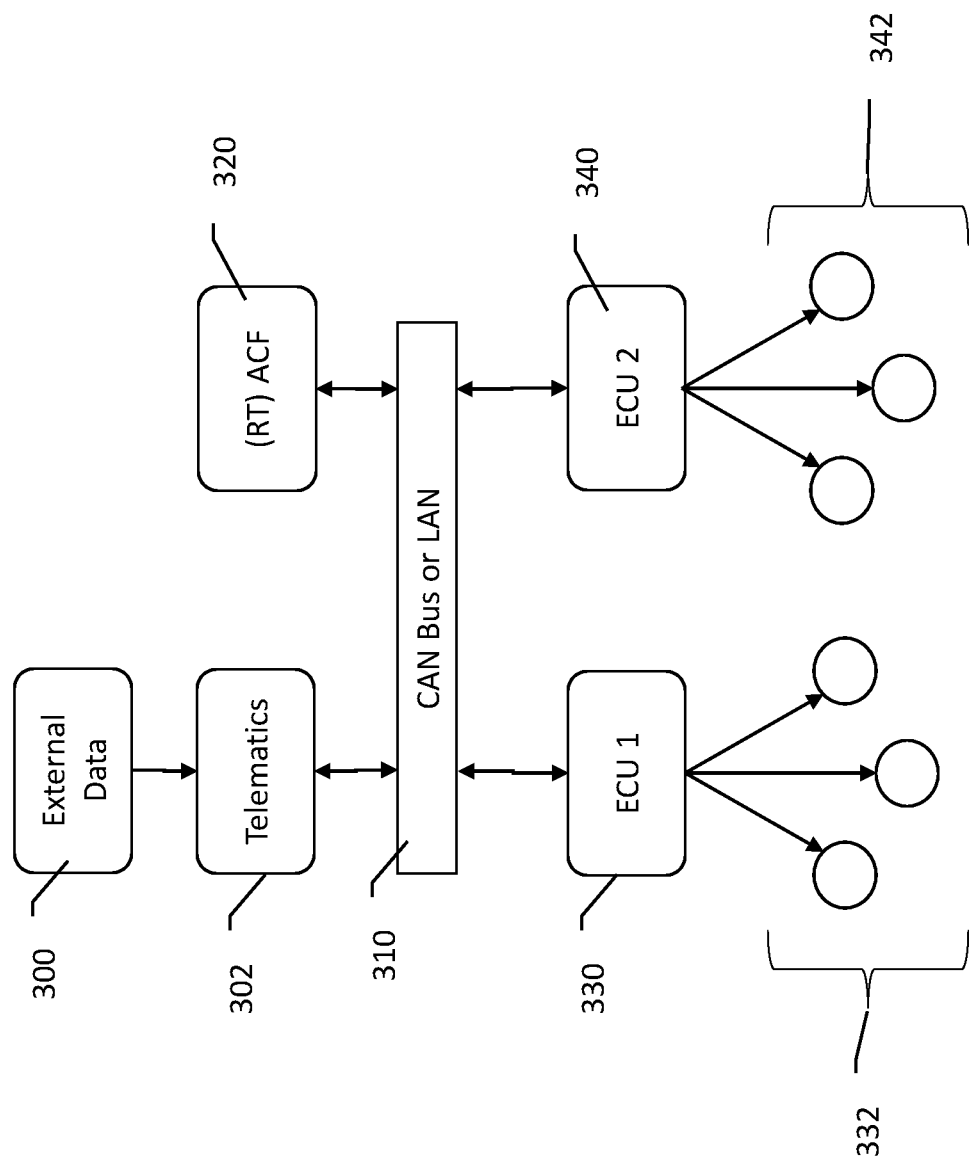

FIGS. 2-4 show illustrative control architectures. FIG. 2 shows a prior art architecture for the receipt and use of external data by a system. In the example, an external data source 200 provides a set of data $\{d_0 \ldots d_n\}$ that is received by a telematics unit 202. For example, a wireless connection (cellular, broadband, etc.) may be used, or, in some examples, the "external source" may be a sensor, transducer, or communication system provided in the vehicle that is connected to the telematics unit 202 by wired or wireless connection (wired connection, ethernet, CAN bus, Bluetooth, WiFi, etc.). In other examples, the external data source may be remote from the vehicle and may provide, for example and without limitation, data related to terrain, road topology, weather, traffic, traffic control signals, location, schedules, destination, obstacles, other cars/vehicles, cargo, or any other suitable input. In this prior art example, the telematics unit simply conveys the received data to the various ECUs 210, 220 in the system. In context, the telematics unit 202 may perform data conversion, such as repackaging data packets from one communication standard to another, as needed, such that the data communicated to the ECUs in the system is generally the same as what was received, without analyzing and/or changing the received data.

Each ECU 210, 220 may then receive and capture some or all of the transmitted data. Each ECU 210, 220, is then responsible for determining what, if anything, to do with the incoming data. Ultimately each ECU 210, 220 controls a corresponding subsystem 212, 222 within the vehicle. One or more ECUs may simply ignore incoming data if so configured; other ECUs may use the incoming data to update various analytics and/or parameters used, such as a setpoint or other operational target. Each ECU 210, 220 that uses the incoming data will have to be loaded with operational instruction sets for such use. For example, the incoming data may be combined with existing data, and then analyzed to reconfigure or recalibrate a setpoint or other operational target value.

In the modern vehicle, the individual ECUs are likely to use any of several sophisticated analyses, such as Mathematical Programming (MP), Dynamic Programming (DP), Linear Programming (LP), Quadratic Programming (QP), Sequential Quadratic Programming (SQP), Model Predictive Control (MPC), Kalman Filtering (KF), Linear Quadratic Regulation (LQR), Health Indicators (HI) for prognostic or further optimization, Health Monitoring (HM), Diagnostic Reasoning (DR), mathematical model solvers and/or various Adaptation Algorithms (AA). In the configuration shown in FIG. 2, each ECU 210, 220 must perform these detailed, operations-intensive and complex analyses in order to adjust operations in view of the received data from the external source 200. For example, an ECU 210 may perform a recalibration of one or more parameters or variables by running a relatively complex version of one or more functions, such as using KF in combination with AA to calculate coefficients for mathematical models used in ongoing operations. In another example, the ECU 210 may perform an optimization of one or more parameters or actuators by running a relatively complex optimization routines such as MP, DP, LP, QP, SQP or MPC. This fuller analysis requires significant computational power and memory in each ECU 210, 220, where these fuller capabilities are only needed a small fraction of the actual operating time of each ECU 210, 220. To the extent each ECU 210, 220 is equipped to process the data from an external source and revise its own optimization settings, the computational power, memory demands, and software complexity needed add to the cost of each ECU, as well as multiplying the complexity of each ECU design. In an integrated system having multiple ECUs present, each added bit of complexity adds still more significant expenses to overall system validation and calibration exercises.

One solution may be to include simplified settings, such as by setting each ECU 210, 220 to make prescribed modifications in a non-granular way. For example, assuming ECU 1 controls the power split in a hybrid powered engine, the operation may be adaptive to external data to the extent that there are settings such as "Heavy Load" or "Light Load," where the external data indicates the presence of a load and/or weight/draw on a towing hitch. However, with added complexity and demands for continuous improvement, more complete solutions are desired.

FIG. 3 shows the use of an advanced controls framework (ACF) to facilitate a different approach. Here, an external source of data 250 provides a set of data that is received by an ACF 252, which may operate in "real time" as that term has been defined above. The ACF analyzes the incoming data and calculates one or more setpoints or other control variables to be implemented by the system ECUs 260, 270, which in turn control corresponding subsystems 262, 272. As a result, the ACF can take the input data $\{d_0 \ldots d_n\}$ and calculate specific data outputs, such as $\{a, b, c\}$ and $\{x, y, z\}$, as shown, for each ECU 262, 272. While separate outputs are shown for each ECU, the ACF may reuse one or more outputs for different ECUs and the data sets need not be exclusive.

In some examples, the ACF 252 may include a library of operational instruction sets encoded in non-transitory, tangible media, for performing a range of mathematical functions. The ACF 252 can also include advanced circuitry and processing circuitry, such as one or more central processing units or cores for performing complex operations. In another example, the ACF 252 may also include one or more specialized processors for specific mathematical operations that may benefit from hardware acceleration, like MP, DP, LP, QP, SQP or MPC. In turn, each ECU 260, 270 can be a simpler device, which may be configured to receive parameters, setpoints, or other control variables from the ACF 252, without needing the memory and computational power to perform the fuller analysis of each variable itself. Each ECU 260/270 can be cheaper and simpler than would be necessary if built for performing more complex calibration operations, for example.

Figure 7:
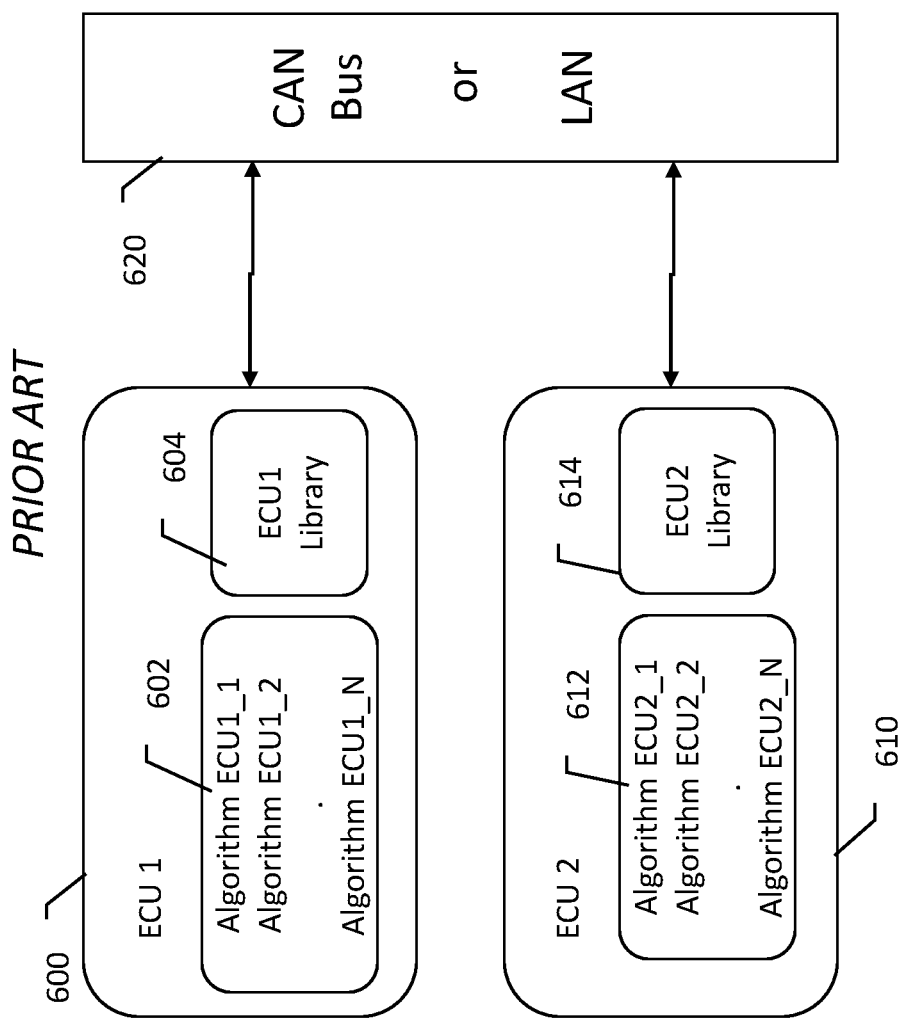
FIG. 7 illustrates a prior art system.
Figure 8:
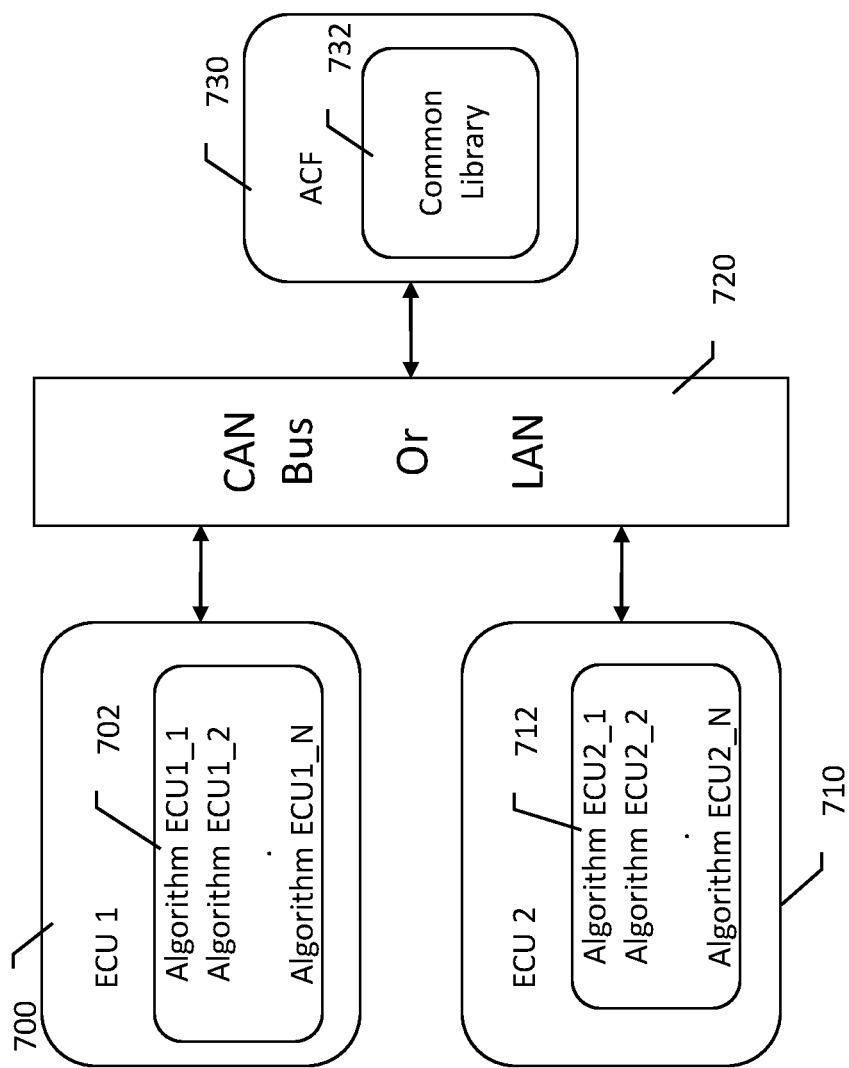
FIG. 8 illustrates another control architecture.

FIG. 3 illustrates the ACF 252 as receiving external data directly. FIG. 4 shows another example. Here, an external source 300 provides data to the telematics unit 302, which in turn directs the data to the CAN Bus or LAN 310. The ACF 320 obtains the data and performs its analysis of the incoming data, for example as shown below in FIG. 6. Updated operating targets, parameters, setpoints or the like are then communicated by the ACF 320 over the CAN Bus or LAN 310 to individual ECUs 330, 340, which then update the parameter sets each relies upon to control respective subsystems 332, 342. FIGS. 7-8, below, provide another example.

Figure 5:
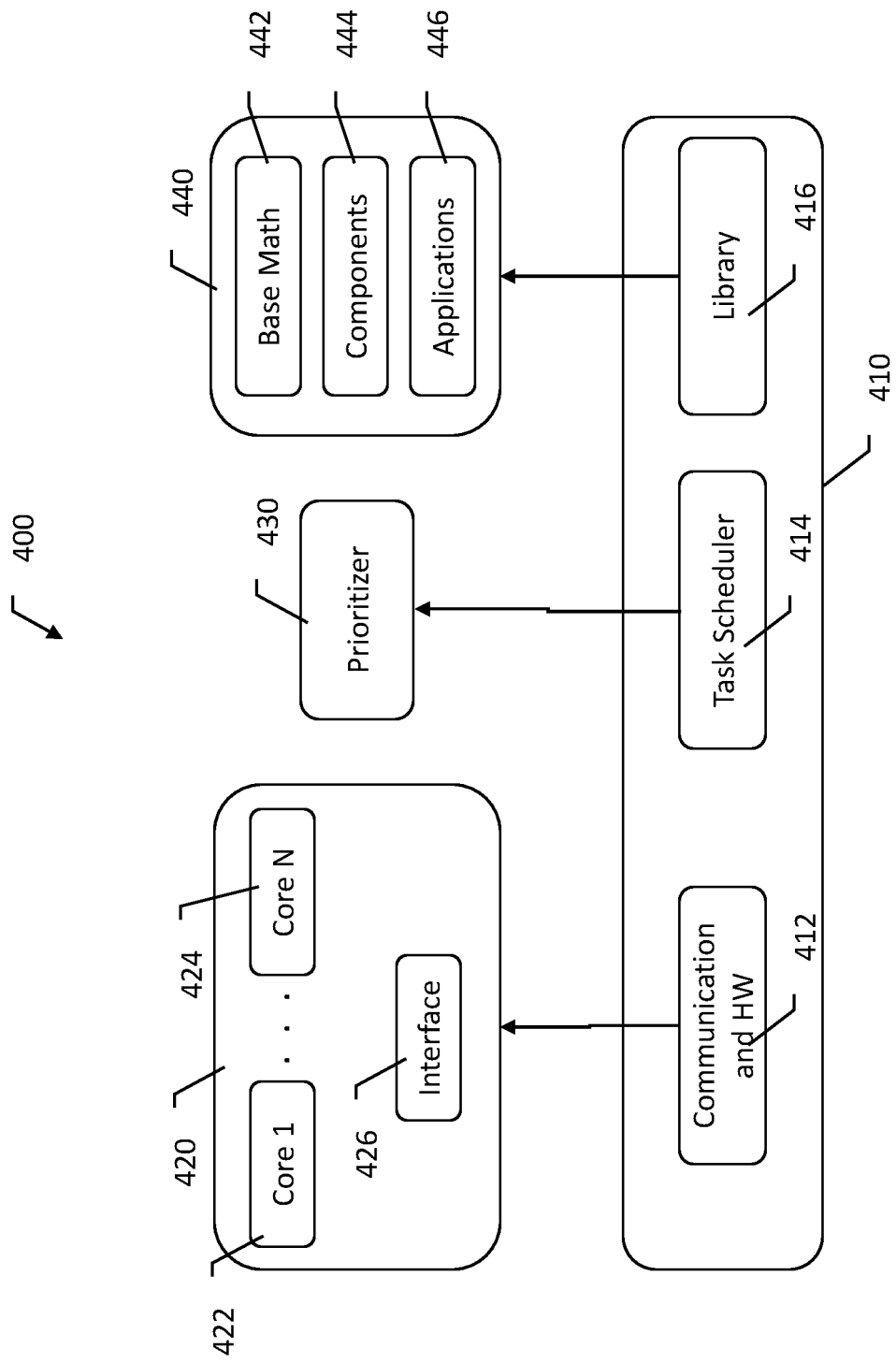
FIG. 5 shows an advanced control framework in block form.

FIG. 5 shows an advanced control framework in block form. The ACF device 400 includes a configurator tool shown at 410, with the contents of each block shown at 420, 430, 440. A communication and hardware block 412 may comprise, for example and as shown, one or more processing cores 422, 424, and a communications interface 426. Each of the processing cores 422, 424 may take the form of a logical or physical microprocessor unit (MCU), and is configured to perform tasks assigned by a task scheduler 414, which may be a separate microprocessor configured as a prioritizer 430 having access to data regarding the order of operations within the ACF device. For example, the prioritizer 430 may determine which of various tasks or ECUs available in the system should be updated with new operating parameters first according to metrics such as potential effects to safety, regulatory compliance, efficiency, comfort, longevity, etc. In an example of prioritization, an incoming message or data indicating a switch from highway driving to city driving may trigger recalibration of a hybrid power split (largely affecting efficiency and vehicle performance), airflow management (affecting emissions and efficiency), and suspension (affecting comfort), and preset prioritization may be encoded in the prioritizer 430 to determine which task or ECU to analyze first. Each of the processing cores 422, 424 may perform assigned tasks using available stored operational instructions in a library 416 (taking the form of a nontransitory memory), which may include basic math instruction sets 442, component definitions 444, and applications 446 allowing processing of data related to specific ECUs and systems within the vehicle.

Illustrative examples of Base Math 442 may be linear or non-linear equation solvers, such as, for example and without limitation, Ordinary Differential Equation (ODE) solvers, Least Squares solvers, lower-upper (LU), Cholesky, LDL or QR factorization/decomposition, and other functions from base Linear Algebra. Illustrative examples of Components 444 may be various functions that build on top of Base Math 442, such as MP, DP, LP, QP, SQP or MPC and other numerical optimization routines. Illustrative examples of Applications 446 may be various functions that build on top of Base Math 441 and/or Components 444, such as Predictive Power Split, Predictive Cruise Control, Predictive Thermal Management, Predictive Energy Management, Water Management (for fuel cell), Total Cost of Ownership Optimization, Health Indicators, Diagnostic Reasoning, Prognostic, and other applications.

Figure 6:
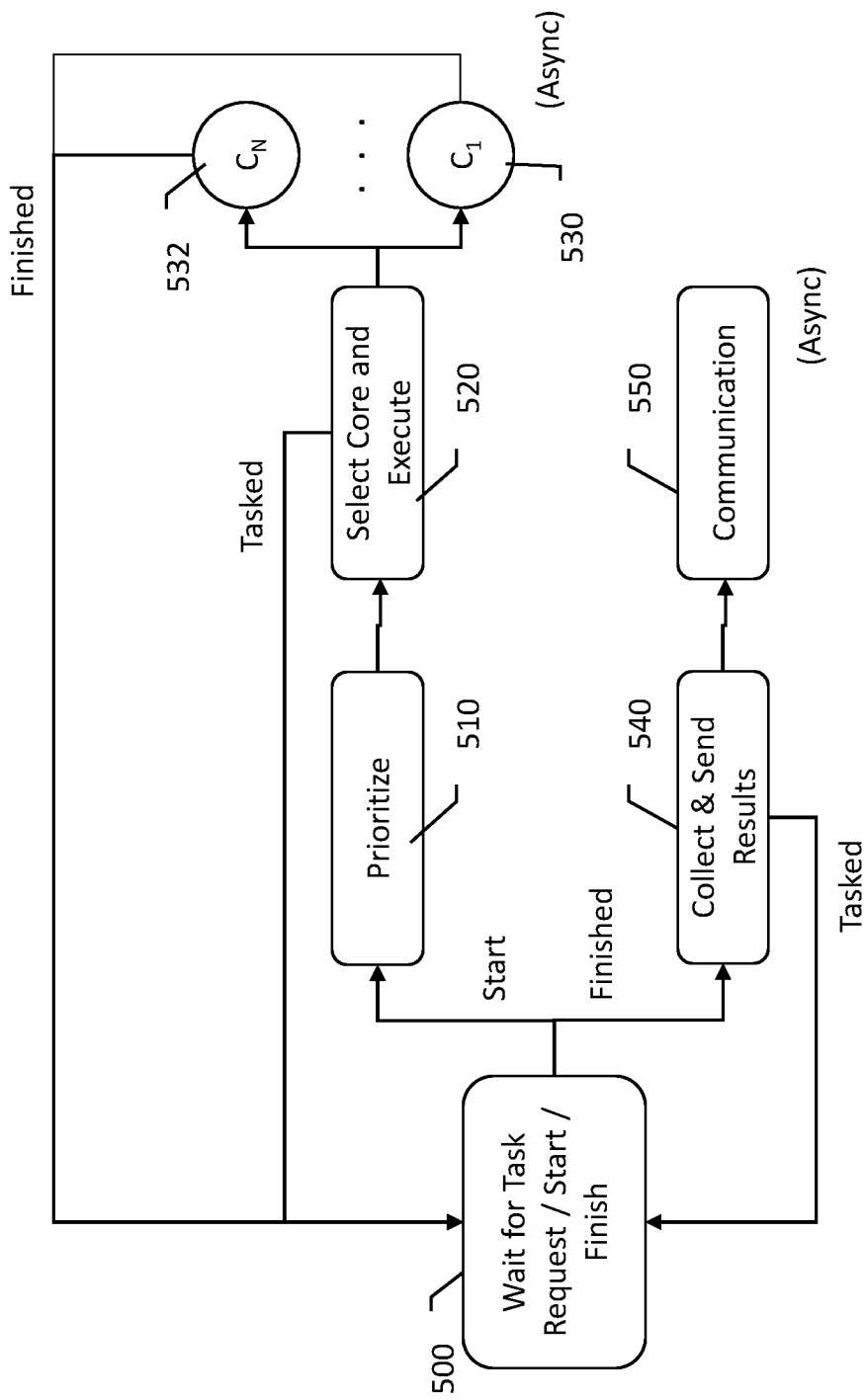
FIG. 6 shows a process flow.

FIG. 6 shows a process flow. In the process flow, block 500 is the wait state, in which the ACF device waits for a task request or an indication that a task is to be started or has finished. If a new task request, or a start task request, is received, the process flow moves to prioritization at 510, where a hardware or virtual core for performing the task is selected at 520. The task is then assigned to an available core 530, 532; as few as 1, or as many as 4, 6, 8 or more cores may be provided. When the task is assigned the system goes back to block 500 and awaits a next tasks request or an indication of a task being completed. If one of the cores 530, 532 finishes an assigned task, a finished signal is generated and the process flow goes back to block 500. When a "finished" report is received, the process from block 500 goes to block 540, where the task results are collected and queued for communication at block 550. Once the task results are queued for communication, the process returns to block 500. The operations in block 550, as well as 530, 532 occur on their own time such that each is assigned within the method, but completion may be asynchronous to the rest of the process flow.

One illustrative process flow using FIG. 6 may be as follows. An external data source, such as a traffic monitoring system (a traffic app, for example), may provide data indicating a current prevailing traffic speed at the location or on the route to be used by the vehicle (which may be autonomous, partly autonomous, or not autonomous). If the traffic data indicates, for example, a current relative free-flowing traffic state will soon change to a traffic jam, this data may be received at the ACF as a task to recalculate power split of the hybrid power system. The new data may be used at block 500 as a task request and is routed to the prioritize block 510. Depending on the time remaining to the anticipated traffic change, the prioritize block 510 may determine where, in the queue of pending tasks, the recalculation of power split should reside. The system may place the new task in a queue, or it may assign the task to one of the cores 530, 532, and return to block 500. If the new task was placed in a queue, the process flow may reside at block 500 until an indication is received from one of the cores 530, 532 that a prior task is complete, prompting the process to route to 540, 550 for the completed task, while also causing the process to again flow through blocks 510, 520 to determine the next task in queue to perform. Whatever task(s) remain ahead of the power split re-assessment are performed in sequence. When the power split assessment task is assigned to a core 530, 532, the analysis is executed, and updated control parameters are generated. The updated control parameters are then communicated to any affected ECU in the system. When the computation is finished, the relevant core 530, 532 generates the finished message, and the process flows to block 540 to gather the results, which are then communicated in block 550.

A similar process flow may take place if, for example the external data is an environmental alert indicating a current state of air quality in location. The system may, in response to poor air quality, trigger reanalysis of setpoints used in engine control and engine airflow control, to reduce emissions, for example. External data may indicate a change in regulatory environment, such as when moving from a rural area with relaxed emissions standards, to an urban area with tighter emissions standards, or when crossing any other governmental entity border at which regulations change.

In another example, terrain data may be integrated. For example, in hilly terrain, the system may use mapping data to determine if the vehicle is going up or down a hill. When going downhill, a hybrid power split can be set to charge the battery, and while going uphill, the hybrid power split can be set to discharge the battery.

In another example, weather data, such as wind, temperature, humidity, and/or precipitation data may be incorporated. In, for example, high wind conditions, the system may elect to adjust braking or steering responsiveness, or to modify a suspension setting, or to adjust the feedforward for engine torque control, to provide steadier operation. In conditions such as snow or rain, control over steering, braking, top speed, etc., may be modified to reduce potential hazards, as desired.

A similar process flow may take place also in another example, when ACF is used as an on-demand computational device. One or multiple ECUs may prepare a task and request ACF to solve that task, with certain priority. An example application may be a Predictive Power Split utilizing MPC technology. Majority of the said predictive power split algorithm is hosted in an ECU, but specific operations, e.g. those included in ACF library Base Math 442 or Components 444 or Applications 446, are executed in ACF on-demand. The said MPC included in Predictive Power Split algorithm requires solution of an optimization routine, such as MP, DP, QP or SQP, which is computationally demanding task and therefore it is off-loaded by the ECU to ACF.

In another use case, illustrated in FIGS. 7-8, an ACF is used as an on-demand computational device, to off-load complex computational tasks from ECUs. The complex computational tasks may include MP, DP, LP, QP, SQP or MPC, or any other tasks that typically require more computational power and memory. In prior art, the complex computational tasks were handled directly in ECUs. As shown in FIGS. 7-8, a different solution is provided herein.

In some examples, the performance of such tasks by an ACF may be responsive to external data, whether from a user or from some other data source (map, weather, traffic data, etc.). In some other examples, an individual ECU may recognize itself that a change requiring a recalibration or other complex procedure has taken place. For example, with a system having a health monitor function integrated into an ECU, the ECU may determine that one or more subsystem components has aged to a point where operational parameters require updating. For example, a battery may age, changing the recharging or discharging characteristics thereof, or a valve may become clogged or partly clogged, or an actuator may age, changing the ability of the actuator to reach the ends of its actuation range or changing the speed at which the actuator responds to a command signal. Any change within a subsystem or component of a subsystem may be observed by the ECU associated with such subsystem or component, and the ECU may respond by requesting the ACF perform a complex computational task to better optimize operation of the ECU responsive to the change. The ACF then recalculates or updates a control parameter used in the system. The updated control parameter may be calculated to the ECU that identified the change, or to a different ECU controlling a hardware operation to which the updated control parameter is applicable, or to both.

Starting with FIG. 7, a prior art architecture is illustrated. A first ECU 600 stores in memory, and has hardware including a processor for executing, various different instruction sets including algorithms 602 that the first ECU 600 performs to control the subsystem that it is associated with. In addition, the first ECU 600 stores a library 604 of mathematical functions that are executed within the given algorithms and/or for calibration or other purposes of the first ECU 600.

Likewise, a second ECU 610 also stores in memory, and has hardware including a processor for executing, various different instruction sets including algorithms 612 that the second ECU 610 performs to control the subsystem that it is associated with. In addition, the second ECU 610 stores a library 614 of mathematical functions that are executed within the given algorithms and/or for calibration or other purposes of the second ECU 610.

The first and second ECUs 600, 610 are communicatively coupled to other parts of the vehicle system via a CAN Bus or LAN 620. Often, the two libraries 604, 614 contain stored instruction sets in tangible memory that are similar or identical in function and/or design, generally speaking, though the actual code of each may vary due to variations between the manufacturers of the separate ECUs 600, 610. In addition, each ECU 600, 610 has a processor built not only to perform the processes necessary to operation of each ECU 600, 610 and associated subsystem during ongoing operation, but also to perform the more complex and intensive operations associated with calibration, recalibration, and updating of various inputs to those algorithms. Each of the manufacturers of the ECUs 600, 610 will also need to validate not only the operations algorithms 602, 612, but also the operations stored in the function libraries 604, 614. The extra memory, processor capability, and validation requirements create further redundancies and potential waste.

FIG. 8 illustrates an enhancement relative to FIG. 7. Here, a first ECU 700 stores a set of operating algorithms 702, and a second ECU 710 stores a set of operating algorithms 712. Each of the ECUs 700, 710 communicates over a CAN Bus or LAN to an ACF which now stores the Common Library 732, where the Common Library 732 includes operational instruction sets configure to perform the various complex mathematical functions described above. For example, recalibration of variables used in the algorithms of each ECU 700, 710 can now be performed on the ACF. The extra memory and processing capacity previously needed in the ECUs 700, 702 to run function of the common library 732 can be shifted to the ACF 730, reducing the redundancy and expenses of each ECU 700, 710. Moreover the function of the common library 732 can be validated on the ACF, rather than requiring each manufacturer of each ECU 700, 710 to perform this task, again reducing redundancy.

A further advantage is that each ECU 700, 710 can maintain an operational state during recalibration procedures. That is, with prior art systems as in FIG. 7, when an ECU goes to perform a calibration procedure, processing power is diverted to the calibration and may force the ECU offline for a period of time, or may force an ECU to implement a simplified operation state during the recalibration procedure, causing suboptimal operation during such time period. With the configuration of FIG. 8, the ACF has all the resources necessary to perform the complex recalibration math, allowing each ECU 700, 710 to continue operating according to prior calibration until the ACF communicates new calibration parameters or other settings to each ECU 700, 710, at which point each ECU 700, 710 can perform a relatively quick update to implement new settings, minimizing or eliminating any time spent off-line in each ECU 700, 710.

In some examples a distinction can be made between high level executory functions and lower level operational functions. For example, in an autonomous system, a central unit or autonomous controller may control operations of the vehicle by issuing, for example, a power demand to the engine. Responsive to the autonomous controller, the individual ECUs of the vehicle system perform their internal operations to meet to the power demand. The autonomous controller in such a system generally will not take steps to manage how the individual ECUs respond to the power demand. Thus, while the autonomous controller in such a system may respond to external data, it does so without taking steps to optimize the underlying vehicle operation. The ACF as described above, acts to integrate the externally received information on which the autonomous controller makes decisions to also optimize the underlying vehicle operation, such as by updating control parameters, including calibration, for example.

In an example, a vehicle control system may thus comprise at least a first subsystem control unit 700 configured to control a first hardware operation in the vehicle, the first subsystem control unit 700 configured to determine a control solution in the form of a set of commands for the first hardware operation using at least one supplied control parameter. The control solution as described can be achieved by the first subsystem control unit, which may be an ECU as described above, running one or more underlying algorithms for operation of the ECU, as indicated at 702, using the supplied control parameters. Further, the first subsystem control unit is configured to: monitor one or more components of the vehicle to determine a change in an operating characteristic of the one or more components; determine that the change in the operating characteristic necessitates recalculation of the at least one supplied control parameter; and generate an update communication including data related to the change in operating characteristic. Such a procedure can be understood by reference to FIG. 4, where an ECU 330 controls one or more of the hardware components 332. During operation the ECU monitors the performance of the hardware components 332, such as by having one or more monitors associated with a controlled component 332, or by monitoring the output of one or more sensors that can be used to determine whether and when a controlled component is actuated. For example, if a controlled component is an actuator, it may be that a monitor is associated with the actuator to determine a position of the actuator or whatever valve or other component is being manipulated by the actuator. If the controlled component is a valve for example, a pressure, mass flow, temperature, or other sensed characteristic may be monitored to determine, for example, if pressure changes because the valve has opened, closed, or otherwise changed position. The ECU itself may be initialized relative to the controlled component such that the ECU can recognize whether and when the system state has changed in response to the action of the controlled component. For example, the ECU can be initialized or calibrated when the controlled component is new to recognize that the control signal supplied to the controlled component, or a change to such a control signal, correlates to a sensed position or characteristic, or change thereof. When the correlation fails, however, the ECU can recognize that a change has taken place, and generates an output, such as by indicating that a valve is clogged or partly clogged, or an actuator no longer reaches its full extent of movement, or moves slower than when new, depending on the recognized issue. The system can then further comprise a centralized optimization unit, which may be an ACF as described above, coupled to the first subsystem control unit and configured to: receive the update communication from the first subsystem control unit and the data related to the change in the operating characteristic; calculate a modification to the at least one supplied control parameter using the data related to the change in the operating characteristic, resulting in an updated control parameter; and communicate the updated control parameter to the first subsystem control unit; wherein the first subsystem control unit is further configured to control the hardware operation using the updated control parameter.

Continuing the example, as illustrated in FIG. 6, the centralized optimization unit may be configured to schedule a time for the calculation of the modification, and the first subsystem control unit is configured to continue using the supplied control parameter to control the first hardware operation until it receives the updated control parameter from the centralized control unit.

Continuing the example, as illustrated in FIGS. 3, 4 and 8, the system may also include a second subsystem control unit that controls a second hardware operation using the supplied control parameter, wherein: the centralized optimization unit is configured to communicate the updated control parameter to the second subsystem control unit; and the second subsystem control unit is configured to use the supplied control parameter until receipt of the updated control parameter. Reuse of parameters may take place as, for example, could occur if a system has redundant components or otherwise has components that are linked together.

In another example, a vehicle control system operable in a vehicle having a plurality of hardware components, the vehicle control system comprising: a health monitoring processor configured to monitor health of one or more of the hardware components of the vehicle, the health monitoring processor further configure to generate health messages relating to the health of the one or more monitored hardware components. A health monitor can be operable by monitoring the response of various system components to control signals, as well as monitoring how the system operation changes as system components receive different control signals. For example, given a valve in the system that controls mass flow (fuel, air, etc.), the health monitor may be configured to capture observer signals related to the valve, such as by having a monitor that determines the valve position, where the health monitor determines whether the valve position changes in a predicted way responsive to a change in valve position control signal. In another example, a valve can be monitored by a health monitor observing whether mass flow, or a product of mass flow, such as a change in temperature or pressure within the system, changes in response to actuation of the valve in a predicted manner. In these examples, without limitation, the "predicted manner" may reflect information learned during modeling of the valve performance, during initialization or calibration, or data obtained from a manufacturer. The health monitor may also track usage or age of an actuator relative to a rated life of the actuator, and is configured to determine a "state" of the monitored item, such as "new," "worn," "replacement needed," etc., or on a scale (0 to 10, for example, or 0 to 100% remaining life, etc.).

Continuing the example, the vehicle control system may also include a first subsystem control unit configured to control at least a first hardware component in the vehicle, the first subsystem control unit configured to determine a control solution in the form of a set of commands for the first hardware component using at least one supplied control parameter. Referring to FIG. 8, the subsystem control unit may be one of 700, 710, for example, or referring to FIGS. 3-4, any of 260, 270, 330, 340 may be a subsystem control unit, and the subsystem control unit may be an ECU as described. The vehicle control system then also includes a centralized optimization unit, which may be an ACF as described above, coupled to the first subsystem control unit and the health monitoring processor, the centralized optimization unit configured to: receive a health message from the health monitoring processor; perform a calibration of the at least one supplied control parameter in response to receiving the health message and thereby calculate a modification to the at least one supplied control parameter, resulting in an updated control parameter; and communicate the updated control parameter to the first subsystem control unit; wherein the first subsystem control unit is further configured to control the hardware operation using the updated control parameter.

In some examples, the plurality of hardware components comprises a battery and an internal combustion engine; the health monitoring processor is configured to determine the health the battery and communicate a battery health message to the centralized optimization unit; and responsive to the battery health message, the centralized optimization unit is configured to calibrate a parameter used in determining power split between the battery and the internal combustion engine. Determining the "health" of the battery may include, for example, and without limitation, calculating an internal resistance of the battery, or a maximum voltage or power stored by the battery, and/or an age of the battery (relative to duration or usage, as desired).

In some examples, the plurality of hardware components comprises an actuator that controls position of a valve; the health monitoring processor is configured to determine the health of the actuator and communicate an actuator health message to the centralized optimization unit; the first subsystem control unit is configured to issue control signals to the actuator; and the updated control parameter changes how the first subsystem control unit issues control signals to the actuator. Health of the actuator may be determined by determining the age of the actuator (based on duration or cyclic usage), or the ability of the actuator to continue to achieve its full range of motion, or the speed at which the actuator performs its movement, for example and without limitation.

In some examples, the system may further include at least one receiving unit for receiving prediction data either from a user of the vehicle or from a source external to the vehicle; wherein the centralized optimization unit is configured to receive prediction data from the receiving unit and, responsive thereto, to perform calibration of the at least one supplied control parameter using the prediction data resulting in a recalibrated control parameter, and to communicate the recalibrated control parameter to the first subsystem control unit. Such prediction data may, for example, relates at least one of traffic and terrain. In other examples, the prediction data may relate to regulatory or air quality issues, such as by reflecting the crossing of a border or movement from a rural to an urban area, where the emissions standards relevant to vehicle operation change.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A vehicle control system comprising:
at least one subsystem control unit configured to control a hardware operation in the vehicle, the at least one subsystem control unit configured to determine a solution in the form of a set of commands for the hardware operation using at least one supplied control parameter, the solution determined using an operating algorithm having one or more calibration variables;
a telematics unit for receiving prediction data either from a user of the vehicle or from a source external to the vehicle;
a centralized optimization unit coupled to each of the at least one subsystem control unit and the telematics unit and configured to:
receive prediction data from the telematics unit;
determine, within a prediction horizon, a modification to the one or more calibration variables using the prediction data; and
communicate the modification to the one or more calibration variables to the at least one subsystem control unit; wherein:
the centralized optimization unit comprises at least one data processor and a library of stored instruction sets on non-transient media,
the library including at least one stored instruction set configured to perform Advanced Control operations including at least one of Model Predictive Control, Kalman Filtering, Linear Quadratic Regulation, and Adaptation Algorithms, and
the calibration variables include a mathematical model coefficient used in ongoing operations of the at least one subsystem control unit.

2. The vehicle control system of claim 1 wherein the library further includes at least one further stored instruction set configured to perform one or more Linear Algebra operations, including at least one of Linear Equation Solver, Least Squares, LU, Linear Quadratic Regulation (LQR), LDL, and/or Cholesky factorization.

3. The vehicle control system of claim 1 wherein the library further includes at least one further stored instruction set configured to perform Numerical Optimization operations including at least one of a Dynamic Programming, Linear Programming, Quadratic Programming, Sequential Quadratic Programming, Mixed Integer Programming.

4. The vehicle control system of claim 1 wherein the library further includes at least one further stored instruction set configured to perform Smart Diagnostic and Prognostic for Vehicle Health Monitoring operations including at least one of Health Indicators, Machine Learning, Prognostic Algorithms, Bayesian Network, Expert System, Diagnostic Reasoner.

5. The vehicle control system of claim 1 wherein:
the vehicle is a hybrid vehicle having a power system including each of an internal combustion engine and a drive motor, the power system operating using a power split parameter to determine which of the internal combustion engine and the drive motor will deliver power;
the subsystem control unit is coupled to the internal combustion engine and the drive motor to control usage thereof in accordance with the power split parameter;
the data external to the vehicle includes traffic data; and
the centralized optimization unit is configured to modify the power split parameter using the traffic data.

6. The vehicle control system of claim 1 wherein:
the vehicle is a hybrid vehicle having a power system including each of an internal combustion engine and a drive motor, the power system operating using a power split parameter to determine which of the internal combustion engine and the drive motor will deliver power;
the subsystem control unit is coupled to the internal combustion engine and the drive motor to control usage thereof in accordance with the power split parameter;
the data external to the vehicle includes terrain data; and
the centralized optimization unit is configured to modify the power split parameter using the terrain data.

7. The vehicle control system of claim 1 wherein:
the vehicle is a hybrid vehicle having a drive motor coupled to each of a fuel cell and a battery, the drive motor using a power split parameter determining which of the fuel cell and the battery will provide power to the drive motor;
the subsystem control unit is coupled to the drive motor and controls power inputs to the drive motor to control usage thereof in accordance with the power split parameter;
the data external to the vehicle includes traffic data; and
the centralized optimization unit is configured to modify the power split parameter using the traffic data.

8. The vehicle control system of claim 1 wherein:
the vehicle is a hybrid vehicle having a drive motor coupled to each of a fuel cell and a battery, the drive motor using a power split parameter determining which of the fuel cell and the battery will provide power to the drive motor;
the subsystem control unit is coupled to the drive motor and controls power inputs to the drive motor to control usage thereof in accordance with the power split parameter;
the data external to the vehicle includes terrain data; and
the centralized optimization unit is configured to modify the power split parameter using the terrain data.

9. The vehicle control system of claim 1 wherein:
the centralized optimization unit is coupled to at least a first subsystem control unit operating using a first calibration variable and a second subsystem control unit operating using a second calibration variable, one of which is the at least one subsystem control unit; and
the centralized optimization unit is configured to:
analyze the received prediction data and determine priority between the first and second subsystem units; and
determine modifications to the first and second calibration variables in an order determined by the priority.

10. The vehicle control system of claim 1 wherein:
the at least one data processor is configured to determine the modification to the at least one calibration variable using the prediction data;
the stored instruction sets include at least a first instruction set for performing a first mathematical analysis of data and a second instruction set for performing a second mathematical analysis of data; and
the centralized optimization unit includes a task scheduler for determining and causing execution of an order of operations by the at least one data processor using the prediction data and each of the first instruction set and the second instruction set.

11. A method of controlling a vehicle system comprising:
with a first subsystem control unit configured to control a hardware operation in the vehicle, determining a control solution in the form of a set of commands for the hardware operation using at least one supplied control parameter, wherein the control solution is determined using an operating algorithm having one or more calibration variables;
receiving prediction data either from a user of the vehicle or from a source external to the vehicle at a telematics unit;
with a centralized optimization unit coupled to each of the at least one subsystem control unit and the telematics unit:
receiving prediction data from the at least one telematics unit;
determining, within a prediction horizon, a modification to the one or more calibration variables using the prediction data; and
communicating the modification to the one or more calibration variables to the at least one subsystem control unit; wherein:
the centralized optimization unit comprises at least one data processor and a library of stored instruction sets on non-transient media,
the library including at least one stored instruction set configured to perform Advanced Control operations including at least one of Model Predictive Control, Kalman Filtering, Linear Quadratic Regulation, and Adaptation Algorithms, and
the calibration variables include a mathematical model coefficient used in ongoing operations of the at least one subsystem control unit.

12. The method of claim 11, wherein the modification is determined using one or more Smart Diagnostic and Prognostic for Vehicle Health Monitoring operations including at least one of Health Indicators, Machine Learning, Prognostic Algorithms, Bayesian Network, Expert System, Diagnostic Reasoner, instruction sets for which are stored in the library of stored instruction sets.

13. The method of claim 11, wherein:
the vehicle is a hybrid vehicle having a power system including each of an internal combustion engine and a drive motor, the power system operating using a power split parameter to determine which of the internal combustion engine and the drive motor will deliver power;
the subsystem control unit is coupled to the internal combustion engine and the drive motor to control usage thereof in accordance with the power split parameter;
the data external to the vehicle includes traffic data; and
the modification uses the traffic data to modify the power split parameter.

14. The method of claim 11, wherein:
the vehicle is a hybrid vehicle having a power system including each of an internal combustion engine and a drive motor, the power system operating using a power split parameter to determine which of the internal combustion engine and the drive motor will deliver power;
the subsystem control unit is coupled to the internal combustion engine and the drive motor to control usage thereof in accordance with the power split parameter;
the data external to the vehicle includes terrain data; and
the modification uses the terrain data to modify the power split parameter.

15. The method of claim 11, wherein:
the vehicle is a hybrid vehicle having a drive motor coupled to each of a fuel cell and a battery, the drive motor using a power split parameter determining which of the fuel cell and the battery will provide power to the drive motor;
the subsystem control unit is coupled to the drive motor and controls power inputs to the drive motor to control usage thereof in accordance with the power split parameter;
the data external to the vehicle includes traffic data; and
the modification uses the traffic data to modify the power split parameter.

16. The method of claim 11, wherein:
the centralized optimization unit is coupled to at least a first subsystem control unit operating using a first calibration variable and a second subsystem control unit operating using a second calibration variable, one of which is the at least one subsystem control unit; and
the method further comprises:
the centralized optimization unit analyzing the received prediction data and determining priority between the first and second subsystem units; and
determining modifications to the first and second calibration variables in an order determined by the priority.

17. The method of claim 11, wherein:
the at least one data processor is configured to determine the modification to the at least one calibration variable using the prediction data;
the stored instruction sets include at least a first instruction set for performing a first mathematical analysis of data and a second instruction set for performing second mathematical analysis of data; and
the method comprises the centralized optimization unit, via a task scheduler, determining and causing execution of an order of operations by the at least one data processor using the prediction data and each of the first instruction set and the second instruction set.

* * * * *